Sept. 11, 1951  J. N. APGAR  2,567,312
TURNTABLE FOR FIFTH WHEEL TRAILER COUPLINGS
Filed June 7, 1948  2 Sheets-Sheet 1

Inventor:
John N. Apgar,
Pierce, Scheffler & Parker,
Attorneys.

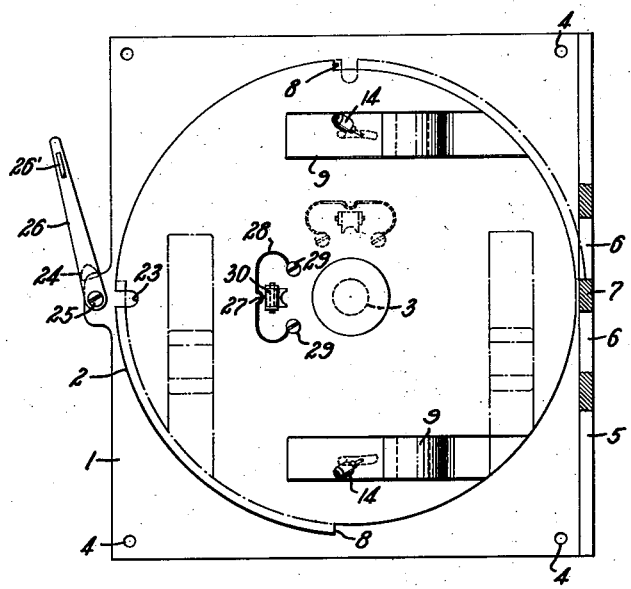
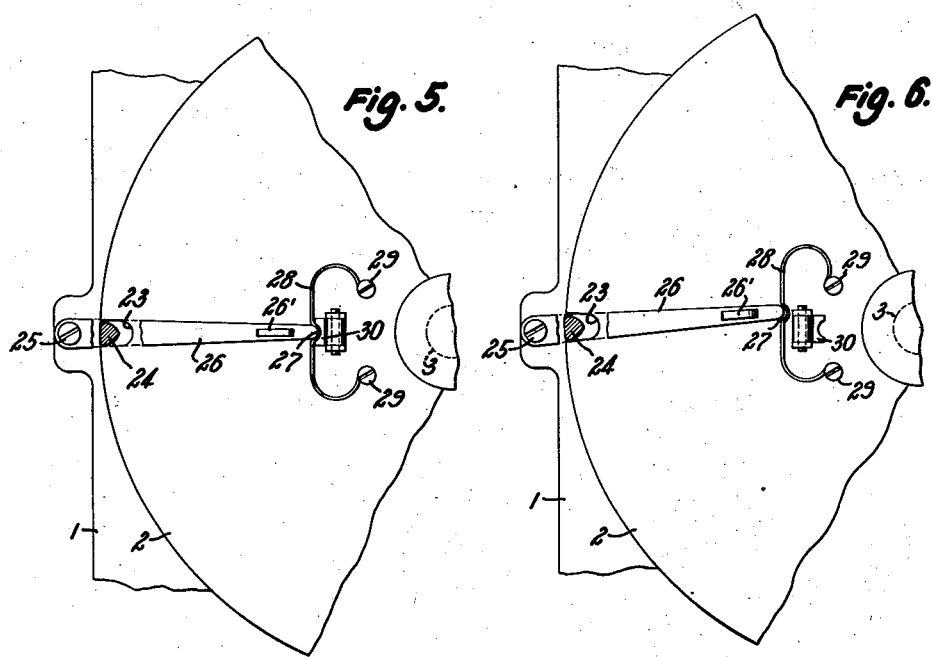

Patented Sept. 11, 1951

2,567,312

UNITED STATES PATENT OFFICE 2,567,312

TURNTABLE FOR FIFTH WHEEL TRAILER COUPLINGS

John N. Apgar, Bound Brook, N. J.

Application June 7, 1948, Serial No. 31,453

13 Claims. (Cl. 280—33.05)

This invention relates to turntables for supporting the tractor-carried elements of a fifth wheel coupling, and more particularly to novel mechanism for preventing relative angular movement of the turntable plates.

Turntable fifth wheel couplings such as described and claimed in my prior Patent No. 2,442,914, granted June 8, 1948, afford a stable support for a semi-trailer by locking the conventional fifth wheel plates together with the rocking axis parallel to the trailer axle; the locked fifth wheel coupling being supported upon a turntable which permits the necessary relative angular movements of the tractor and trailer. A tractor equipped with a turntable may be employed with a trailer having a fifth wheel plate not provided with slots for receiving locking keys carried by the lower fifth wheel plate, but the turntable plates must then be locked against relative angular movement.

Objects of the present invention are to provide turntables having novel mechanism for impositively latching, or alternatively for positively locking, the turntable plates against relative angular movement. Another object is to provide turntables having simple and rugged stop elements for limiting the angular movement of the upper turntable plate to a desired amount, for example to about 180°. A further object is to provide a turntable fifth wheel coupling having an improved form of latching mechanism for locking the fifth wheel plates to each other.

These and other objects and the advantages of the invention will be apparent from the following specification when taken with the accompanying drawings in which:

Fig. 4 is a plan view, with parts in section, of the turntable after removal of the lower fifth wheel plate;

Figs. 5 and 6 are plan views, with parts broken away, of the latch mechanism adjusted for positive locking and for impositive latching, respectively; and Fig. 7 is a perspective view of the latching arm and lug.

Figure 1:
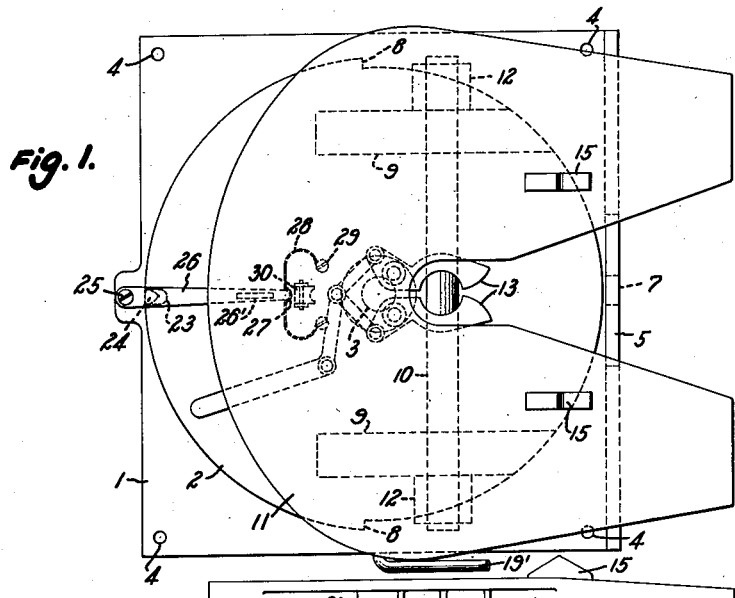
Fig. 1 is a plan view of an assembled turntable and lower fifth wheel plate embodying the invention.

In the drawings, the reference numerals 1 and 2 identify a lower and an upper plate, respectively, which are in surface contact and pivotally connected by a pivot pin 3 to form a turntable. The lower plate is preferably of rectangular shape and provided with openings 4 adjacent the corners for receiving clamping bolts, not shown, by which the turntable may be rigidly mounted upon a tractor. The upper turntable plate is approximately circular, but with its rearward one-half of somewhat smaller radius than the forward section to clear a reinforcing and stop flange 5 which extends upwardly along the rear edge of the lower turntable plate. Openings 6, 6 are cut in the flange 5 at opposite sides of the longitudinal axis of the plate 1 to leave an integral stop rib 7, the openings being of such size that the radial flanges 8, 8 at the junction of the different radius sections of the plate 2 may enter the openings to engage the stop rib 7, thereby limiting the turning movement of the plate 2 to about 180°, i. e. limiting the turning of the tractor to about 90° with respect to the longitudinal axis of the coupled trailer.

Trunnions 9 are mounted on the turntable plate 2 to support a rock shaft 10 with its axis spaced slightly to the rear of the turntable pivot pin 3, and the lower plate 11 of a fifth wheel coupling is journalled on the rockshaft 10 by trunnions 12. The fifth wheel plate is of conventional forked or yoke type for receiving the king pin of the cooperating fifth wheel plate which is carried by a semi-trailer. An automatic or semi-automatic clutch 13 for locking engagement with the king pin is mounted on the lower face of the plate 11.

Adequate lubrication of the turntable plates is provided by grease fittings 14 which are set in the trunnions 9 and open into passages which extend through the trunnions and the upper turntable plate 2.

Figure 2:
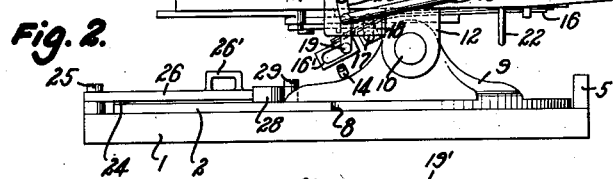
Fig. 2 is a side elevation of the same.

Latch keys 15 for locking engagement in openings of the upper fifth wheel plate are carried by leaf springs 16 secured to a rod or shaft 17 journalled in openings in reinforcing ribs 18 at the lower face of the fifth wheel plate 11, and the key ends of the leaf springs may be turned towards and away from the plate 11 by a crank rod 19 to project the keys 15 above or to withdraw them below the upper surface of the plate 11. Crank rod 19 extends through slotted blocks 16′ which are welded to the forward ends of the leaf springs 16, and one end 19′ of the crank rod is bent at right angles to form an operating handle at an edge of the fifth wheel plate 11. An apertured lug 20 is welded to the rod 19, and its opening alines with a hole in plate 11 to receive a pin 21 for holding the handle 19′ in raised position, i. e. with the springs 16 turned counter-clockwise, as seen in Fig. 2, to project the keys 15 above the fifth wheel plate 11. The springs 16 are guided in U-shaped loops 22 which depend below the lower face of the plate 11, and the loops have the additional function of limiting the downward movement of the springs 16 and keys 15 into inoperative position.

Figure 3:
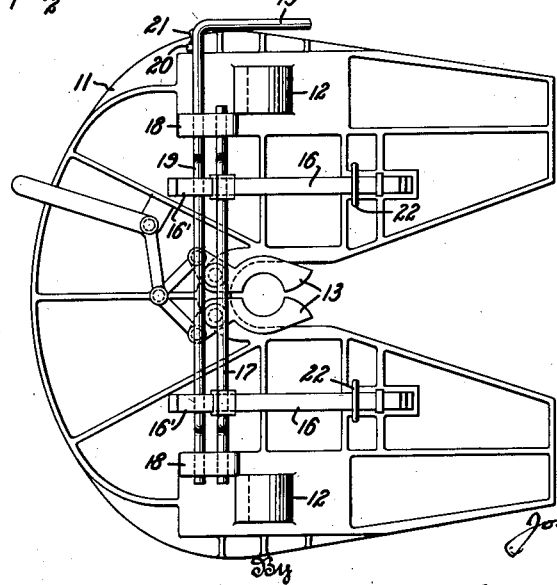
Fig. 3 is a bottom view of the lower fifth wheel plate.

The keys 15 are lowered into inoperative position when a tractor equipped with the turntable fifth wheel assembly is to be coupled to a trailer with an upper fifth wheel plate of old type which does not have openings to receive the latch keys. The turntable plates 1 and 2 must be positively locked against angular movement in such case to retain the rockshaft 10 parallel to the tractor axles. The locking elements comprise a deep notch 23 in the forward edge of the turntable plate 2, and a cooperating lug 34 which is movable angularly about a pin 25 mounted at the forward edge of the lower turntable plate 1, the locking lug being integral with and lying below the pivoted end of a longer latching lever arm 26. The arm 26 extends radially over the plate 2, when the plates are latched together as shown in Figs. 1 and 2, to seat in the central semi-circular bend or recess 27 of a C-shaped leaf spring 28 whose ends are secured to the turntable plate 2 by bolts 29. A keeper 30, or small plate with an edge recessed to conform to the convex face of the bend 27 of spring 28, is pivotally mounted on plate 2 and may be turned over, from the position shown in Figs. 1, 3 and 6, to embrace the bend 27 snugly and thereby prevent the release of the latch arm 26 from the spring 28, see Fig. 5. This positive locking of plate 2 against rotation is useful only when a tractor having the illustrated equipment is to be coupled to a trailer having a fifth wheel plate without openings for receiving the latch keys 15. In normal use of the equipment with trailers having fifth wheel plates with key-receiving openings, the plate 2 is impositively latched to the lower turntable plate by mutually turning the plate 2 and the latch arm 26 towards each other to enter the latch lug 24 in the plate recess 23, and to seat the end of the arm 26 within the recess 27 of the spring 28, as shown in Fig. 1. The latch arm 26 is preferably provided with an eye or raised loop 26' in which a hooked rod may be engaged for moving the latch arm. The keeper 30 is left in inoperative position, as illustrated in Fig. 6. The fifth wheel plate 11 is thus latched in illustrated position with its forked opening symmetrically positioned with respect to the longitudinal axis of the tractor. The tractor is backed towards a trailer which is to be picked up, and the king pin of the trailer enters the forked opening and is engaged by the clutch 13. The latch prevents inadvertent turning of the fifth wheel plate 11 by pressure of the king pin along an edge of the forked opening during this coupling-up operation, and the fifth wheel plate of the trailer rides over and depresses the latch keys 15 against the pressure exerted by the leaf springs 16. The trailer moves into axial alinement with the tractor on the initial forward travel, and the latch keys 15 then snap into the openings of the trailer fifth wheel plate to lock the fifth wheel plates against relative angular movement. On the next turning movement of the tractor, the latch spring 28 flexes under the pressure exerted upon the latching lug 24 by the turntable plate 2, as shown in Fig. 6, and the latch lever 26 is ejected from its seat in the spring recess 27 upon a preselected angular displacement of the turntable plate 2 to either side of its central latched position, see Fig. 1. The latch lever 26 and spring 28 form a spring toggle which breaks upon a preselected displacement from dead-center condition to throw the latch lug 24 out of the recess 23. The release of the impositive latch takes place automatically and requires no action by the tractor driver.

It is to be noted that both the turntable stops 7, 8 and the latch or lock mechanism are of simple but rugged design to resist the relatively heavy stresses encountered in the operation of tractor-trailer assemblies. Conventional stop pins of reasonable size would be inadequate to prevent jack-knifing but the stop rib 7 is heavily reinforced by the flange 5, which may be of any desired thickness, and the projecting flanges 8 can not be sheared off or crushed by heavy stresses. The latch or lock is particularly advantageous during the present change-over period when many trailers do not have apertured fifth wheel plates and the turntable plates of turntable fifth wheel couplings as described in my prior patent must be locked against operation. Separate mechanisms could be employed for the impositive latch and the positive lock for the turntable but, in accordance with the invention, a single mechanism may afford the impositive latching or the positive locking depending upon the adjustment of the keeper 30.

It is to be understood that the invention is not limited to the apparatus as illustrated and described herein since various modifications in size, shape or relative arrangement fall within the spirit and scope of the invention as set forth in the following claims.

I claim:

1. In a tractor-trailer coupling, a pair of superposed and pivotally connected turntable plates for mounting on a tractor, a forked fifth wheel plate and means carried by the upper turntable plate to support said fifth wheel plate for rocking movement on said turntable, and means for impositively latching said turntable plates to yieldingly oppose turning of the upper turntable plate in either direction from a center position at which the rocking axis of the fifth wheel plate is transverse to the longitudinal axis of the tractor, said latching means releasing automatically upon a predetermined angular movement of said upper turntable plate in either direction from said central position.

2. In a tractor-trailer coupling, the invention as recited in claim 1, in combination with a keeper movable into operative position to lock said impositively latching means against release.

3. In a tractor-trailer coupling, the invention as recited in claim 1, wherein said latching means includes a latching lug pivoted on the lower turntable plate, a latching arm secured to said lug, and a leaf spring secured to the upper turntable plate and having a recess forming a seat for the free end of said latching arm, said upper turntable plate having a recess for receiving said latching lug when said latching arm is seated on said spring.

4. In a tractor-trailer coupling, the invention as recited in claim 3, wherein said spring is of C-shape with the ends thereof anchored to said upper turntable plate, and the seat-forming recess is positioned substantially at the center of said C-shaped spring.

5. In a tractor-trailer coupling, the invention as recited in claim 4, in combination with a keeper plate mounted on said upper turntable plate and movable into operative position to prevent flexing of said spring to release said latching arm from the seat-forming recess of said spring.

6. In a tractor-trailer coupling, the invention as recited in claim 5, wherein said keeper plate is pivotally mounted on said upper turntable plate and has an edge recessed to engage snugly the convex side of the seat-forming recess of said spring when said keeper is turned into operative position.

7. In a tractor-trailer coupling of the type including a turntable supporting a fifth-wheel assembly of members carried respectively by a tractor and a trailer and locked against relative angular movement, a pair of superposed and pivotally connected turntable plates, the upper turntable plate being of generally circular form and the lower turntable plate being rectangular and adapted to be rigidly mounted on a tractor, and cooperating stop means on said plates to limit relative angular movement thereof to the order of 180°; the stop means on said upper plate comprising means defining a radially extending flange at an edge of said upper plate, and the stop means on said lower plate comprising a vertically extending abutment on said lower plate and projecting across the path of movement of said radially extending flange to limit the turning of said upper plate to approximately 90° to one side of its centrally-positioned arrangement with respect to the lower plate.

8. In a tractor-trailer coupling, the invention as recited in claim 7, wherein said upper turntable plate has substantially semi-circular sections of different radii with radially extending flanges at the junctions of said sections, said flanges being movable to engage said vertically extending abutment of lower turntable plate upon relative movement of said plates by approximately 90° to either side of a centrally positioned arrangement of said plates.

9. In a tractor-trailer coupling, a pair of superposed and pivotally connected turntable plates for mounting on a tractor, the upper turntable plate being of approximately circular form with approximately semi-circular sections of different radii joined by radially extending flanges constituting stop elements, and a cooperating stop element on the lower turntable plate for engagement by said radially extending flanges to limit relative angular movement of said turntable plates to the order of 180°.

10. In a tractor-trailer coupling, the invention as recited in claim 7, wherein the lower turntable plate has an upstanding flange at its rear edge, said flange having openings therethrough at opposite sides of an integral stop rib constituting said vertically extending abutment, and said upper turntable plate has approximately semi-circular sections of different radii with radially extending flanges at the junctions of said sections, said extending flanges being movable into said openings to engage said stop rib upon relative movement of said plates by approximately 90° to either side of a centrally-positioned arrangement.

11. In a tractor-trailer coupling, a lower fifth wheel plate of yoke form, a clutch carried by said plate for latching a king pin on an upper fifth wheel plate, a pair of openings through said lower fifth wheel plate, latch keys movable in said openings, leaf springs carrying said latch keys, means supporting said leaf springs for angular movement about points spaced from the key ends thereof, and manually operable means to adjust said springs angularly to project said keys above or alternatively to withdraw them below the upper surface of said lower fifth wheel plate; said manually operable means including a crank rod journalled on said lower fifth wheel plate and having a handle portion thereof accessible at the edge of said lower fifth wheel plate for manual actuation.

12. In a tractor-trailer coupling, the invention as recited in claim 11, wherein slotted blocks are secured to said leaf springs, and said crank rod extends through said slotted blocks.

13. In a tractor-trailer coupling, a pair of superposed and pivotally connected plates forming a turntable for mounting on a tractor, a pair of trunnions secured to the upper turntable plate to support the rock shaft of a fifth wheel plate, and means for lubricating said turntable; said lubricating means including grease fittings mounted on said trunnions, said trunnions and the upper turntable plate having passages therethrough affording communication from the grease fittings to the lower surface of the upper turntable plate.

JOHN N. APGAR.

REFERENCES CITED

The following references are of record in the file of this patent:

UNITED STATES PATENTS

| Number | Name | Date |
|---|---|---|
| 2,146,145 | Hauffman et al. | Feb. 7, 1939 |
| 2,285,784 | Scott | June 9, 1942 |
| 2,441,293 | Seyferth | May 11, 1948 |